(12) United States Patent
Lin et al.

(10) Patent No.: US 12,532,269 B2
(45) Date of Patent: Jan. 20, 2026

(54) USER EQUIPMENT AND METHOD FOR TRANSMITTING POWER HEADROOM REPORT

(71) Applicant: SHARP KABUSHIKI KAISHA, Sakai (JP)

(72) Inventors: Chia-Hung Lin, Taipei (TW); Jia-Hong Liou, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 462 days.

(21) Appl. No.: 17/880,053

(22) Filed: Aug. 3, 2022

(65) Prior Publication Data

US 2023/0042144 A1    Feb. 9, 2023

Related U.S. Application Data

(60) Provisional application No. 63/203,978, filed on Aug. 5, 2021.

(51) Int. Cl.
*H04W 52/36* (2009.01)
*H04L 1/08* (2006.01)
(Continued)

(52) U.S. Cl.
CPC ............ *H04W 52/365* (2013.01); *H04L 1/08* (2013.01); *H04W 16/28* (2013.01); *H04W 80/02* (2013.01)

(58) Field of Classification Search
CPC ....... H04L 1/08; H04L 1/1822; H04L 1/1864; H04L 1/189; H04W 16/28; H04W 80/02; H04W 52/42
(Continued)

(56) References Cited

U.S. PATENT DOCUMENTS

2018/0324715 A1    11/2018  Ryoo et al.
2020/0022094 A1    1/2020  You et al.
(Continued)

FOREIGN PATENT DOCUMENTS

CN    108632891 A    10/2018
CN    110583053 A    12/2019

OTHER PUBLICATIONS

Nokia et al., "Summary #1 of Multi-TRP PUCCH and PUSCH", 3GPP TSG RAN WG1 #104-bis-e e-Meeting, Apr. 12-Apr. 20, 2021, R1-2103843.
(Continued)

*Primary Examiner* — Jae Y Lee
*Assistant Examiner* — Haeshil Jessica Choi
(74) *Attorney, Agent, or Firm* — ScienBiziP, P.C.

(57) ABSTRACT

A method performed by a user equipment (UE) for transmitting a power headroom report (PHR) is provided. The method receives, from a base station (BS), a Radio Resource Control (RRC) configuration including a first RRC parameter that indicates a first operation mode of multiple PHRs. The method transmits, to the BS, a PHR medium access control (MAC) control element (CE) that includes a first power headroom (PH) associated with a first transmission reception point (TRP) and a second PH associated with a second TRP. The first TRP and the second TRP are associated with a serving cell of the BS. The first PH is a first Type-1 PH associated with a first physical uplink shared channel (PUSCH) transmission toward the first TRP. The second PH is a second Type-1 PH associated with a second PUSCH transmission toward the second TRP.

14 Claims, 5 Drawing Sheets

(51) Int. Cl.
*H04W 16/28* (2009.01)
*H04W 80/02* (2009.01)
(58) Field of Classification Search
USPC .......................................................... 370/318
See application file for complete search history.

(56) References Cited

U.S. PATENT DOCUMENTS

| | | | |
|---|---|---|---|
| 2020/0059867 A1 | 2/2020 | Haghighat et al. | |
| 2021/0045070 A1* | 2/2021 | Yi | H04W 72/0446 |
| 2022/0217644 A1* | 7/2022 | Kung | H04W 52/365 |
| 2022/0225247 A1* | 7/2022 | Huang | H04W 52/34 |
| 2022/0322484 A1* | 10/2022 | Babaei | H04W 72/1268 |
| 2023/0048026 A1* | 2/2023 | Huang | H04W 72/23 |
| 2024/0205841 A1* | 6/2024 | Zhu | H04L 5/0051 |
| 2024/0298271 A1* | 9/2024 | Gao | H04W 52/365 |

OTHER PUBLICATIONS

3GPP TS 38.213, "3rd Generation Partnership Project; Technical Specification Group Radio Access Network; NR; Physical layer procedures for control (Release 16)", Technical Specification, V16.6.0 (Jun. 2021).

3GPP TS 38.211, "3rd Generation Partnership Project; Technical Specification Group Radio Access Network; NR; Physical channels and modulation (Release16)", Technical Specification, V16.6.0 (Jun. 2021).

3GPP TS 38.212, "3rd Generation Partnership Project; Technical Specification Group Radio Access Network; NR; Multiplexing and channel coding (Release 16)", Technical Specification, V16.6.0 (Jun. 2021).

3GPP TS 38.214, "3rd Generation Partnership Project; Technical Specification Group Radio Access Network; NR; Physical layer procedures for data (Release16)", Technical Specification, V16.6.0 (Jun. 2021).

3GPP TS 38.321, "3rd Generation Partnership Project; Technical Specification Group Radio Access Network; NR; Medium Access Control (MAC) protocol specification (Release 16)", Technical Specification, V16.5.0 (Jun. 2021).

3GPP TS 38.331, "3rd Generation Partnership Project; Technical Specification Group Radio Access Network; NR; Radio Resource Control (RRC) protocol specification (Release 16)", Technical Specification, V16.5.0 (Jun. 2021).

* cited by examiner

100

USER EQUIPMENT AND METHOD FOR TRANSMITTING POWER HEADROOM REPORT

CROSS-REFERENCE TO RELATED APPLICATION(S)

The present disclosure claims the benefit of and priority to U.S. Provisional Patent Application Ser. No. 63/203,978, filed on Aug. 5, 2021, entitled "MECHANISMS FOR SUPPORTING POWER HEADROOM REPORTING IN MULTI-TRP BASED TRANSMISSION," the content of which is hereby incorporated fully by reference into the present disclosure for all purposes.

FIELD

The present disclosure is related to wireless communication, and more specifically, to user equipment and method for transmitting a power headroom report (PHR) in cellular wireless communication networks.

BACKGROUND

Various efforts have been made to improve different aspects of wireless communication for cellular wireless communication systems, such as $5^{th}$ Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a UE and a method for transmitting a PHR in cellular wireless communication networks.

In a first aspect of the present application, a method performed by a UE for transmitting a PHR is provided. The method includes receiving, from a base station (BS), a Radio Resource Control (RRC) configuration including a first RRC parameter that indicates a first operation mode for multiple PHRs; and transmitting, to the BS, a PHR medium access control (MAC) control element (CE) including a first power headroom (PH) associated with a first transmission reception point (TRP) and a second PH associated with a second TRP. The first TRP and the second TRP are associated with a serving cell of the BS. The first PH includes a first Type-1 PH associated with a first physical uplink shared channel (PUSCH) transmission toward the first TRP. The second PH includes a second Type-1 PH associated with a second PUSCH transmission toward the second TRP.

In an implementation of the first aspect, the method further includes transmitting a first plurality of PUSCH repetitions to the first TRP; and transmitting a second plurality of PUSCH repetitions to the second TRP. Each of the first plurality of PUSCH repetitions and each of the second plurality of PUSCH repetitions are in different slots.

In another implementation of the first aspect, the PHR MAC CE is transmitted in a first slot for the first plurality of PUSCH repetitions, the first PH is for an actual PUSCH transmission associated with the first TRP, and the second PH is for a reference PUSCH transmission associated with the second TRP.

In another implementation of the first aspect, the RRC configuration further includes a second RRC parameter related to a triggering condition for the transmission of the PHR MAC CE, and the second RRC parameter applies to the first TRP and the second TRP.

In another implementation of the first aspect, the second RRC parameter includes a threshold of channel variation for the first TRP and the second TRP.

In another implementation of the first aspect, the second RRC parameter includes a prohibit timer for the transmission of the PHR MAC CE.

In another implementation of the first aspect, the first operation mode for the multiple PHRs is for multiple TRPs for the serving cell, including the first TRP and the second TRP, and the RRC configuration further includes a second RRC parameter that indicates a second operation mode for multiple PHRs for multiple serving cells, including the serving cell.

In another implementation of the first aspect, the first TRP is associated with first spatial relation information, and the second TRP is associated with second spatial relation information.

In a second aspect of the present application, a UE for transmitting a PHR is provided. The UE includes one or more processors and at least one memory coupled to at least one of the one or more processors, where the at least one memory stores one or more computer-executable instructions that, when executed by the at least one of the one or more processors, cause the UE to receive, from a BS, an RRC configuration including a first RRC parameter that indicates a first operation mode for multiple PHRs; and transmit, to the BS, a PHR MAC CE including a first PH associated with a first TRP and a second PH associated with a second TRP. The first TRP and the second TRP are associated with a serving cell of the BS. The first PH includes a first Type-1 PH associated with first PUSCH transmission toward the first TRP. The second PH includes a second Type-1 PH associated with second PUSCH transmission toward the second TRP.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
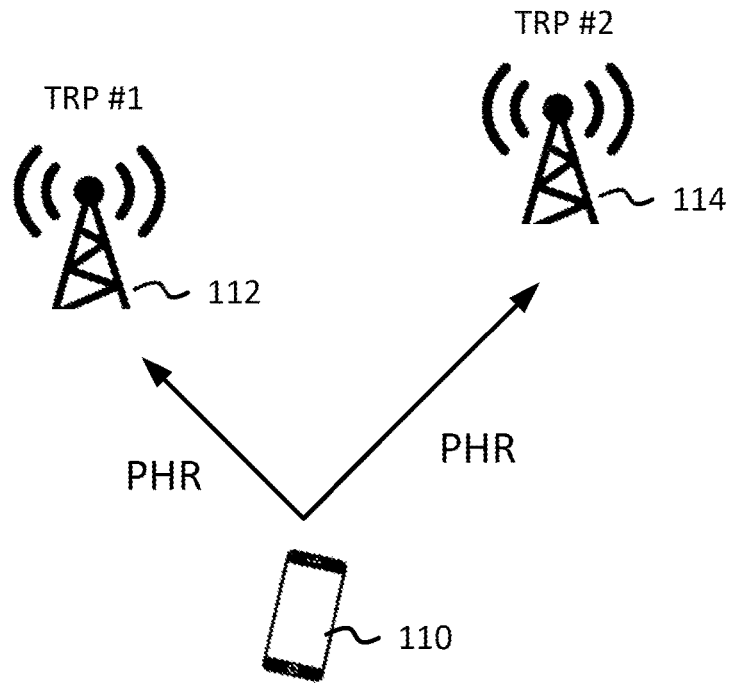
FIG. 1 is a diagram illustrating PHR transmissions in multi-TRP based PUSCH transmissions enabled with repetitions, according to an example implementation of the present disclosure.
Figure 1:
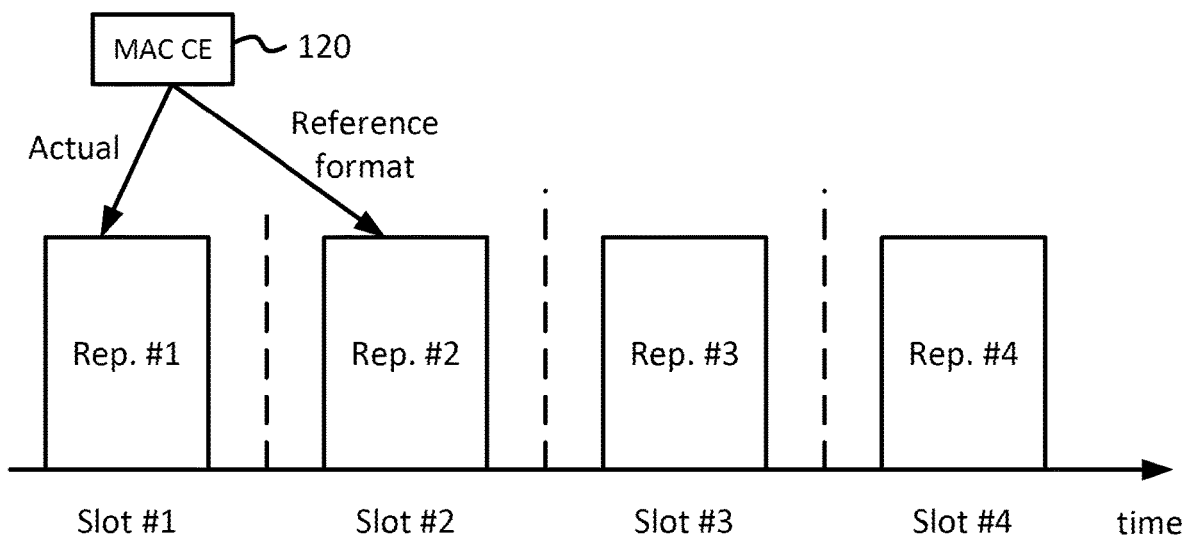

Abbreviations used in this disclosure include:

Abbreviation Full Name

3GPP 3$^{rd}$ Generation Partnership Project
5G 5$^{th}$ Generation
ACK Acknowledgment
BS Base Station
BWP Bandwidth Part
C-RNTI Cell Radio Network Temporary Identifier
CA Carrier Aggregation
CG Configured Grant
CRC Cyclic Redundancy Check
CS-RNTI Configured Scheduling Radio Network Temporary Identifier
CSI-RS Channel State Information Reference Signal
DC Dual Connectivity
DCI Downlink Control Information
DL Downlink
DM-RS Demodulation Reference Signal
E-UTRA Evolved Universal Terrestrial Radio Access
FR Frequency Range
HARQ Hybrid Automatic Repeat Request
HARQ-ACK HARQ Acknowledgement
ID Identifier
IE Information Element
LTE Long Term Evolution
MAC Medium Access Control
MAC CE MAC Control Element
MCG Master Cell Group
MCS Modulation Coding Scheme
MN Master Node
MPE Maximum Permissible Exposure
NR New Radio
NW Network
OFDM Orthogonal Frequency Division Multiplexing
PCell Primary Cell
PDCCH Physical Downlink Control Channel
PDSCH Physical Downlink Shared Channel
PH Power Headroom
PHR Power Headroom Report
PHY Physical (layer)
PRACH Physical Random Access Channel
PUCCH Physical Uplink Control Channel
PUSCH Physical Uplink Shared Channel
QCL Quasi-colocation
RA Random Access
RAN Radio Access Network
Rel Release
RI Rank Indicator
RF Radio Frequency
RNTI Radio Network Temporary Identifier
RRC Radio Resource Control
RRH Remote Radio Head
RS Reference Signal
SCell Secondary Cell
SCG Secondary Cell Group
SN Secondary Node
SRI SRS Resource Indicator
SRS Sounding Reference Signal
TB Transport Block
TCI Transmission Configuration Indicator
TPC Transmission Power Control
TPMI Transmit Precoding Matrix Indicator
TRP Transmission Reception Point
TS Technical Specification
Tx Transmission
UE User Equipment
UL Uplink
URLLC Ultra-Reliable and Low-Latency Communication The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and may not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some selected terms are provided as follows.

RNTI: RNTIs are used to differentiate/identify a connected UE in the cell, a specific radio channel, a group of UEs in case of paging, a group of UEs for which power control is issued by the gNB, and/or system information transmitted for all the UEs by 5G gNB.

Antenna Panel: is a conceptual term for UE antenna implementation. It may be assumed that a panel is an operational unit for controlling a transmission spatial filter (beam). A panel is typically consisted of a plurality of antenna elements. In one implementation, a beam may be formed by a panel and in order to form two beams simultaneously, two panels may be needed. Such simultaneous beamforming from multiple panels is subject to UE capability. A similar definition for "panel" may be possible by applying spatial receiving filtering characteristics.

Beam: the terms "beam" and "spatial filter" may be used interchangeably in this disclosure. For example, when a UE reports to a preferred gNB a Tx beam, the UE is essentially selecting a spatial filter used by the gNB. The term "beam information" is used to provide information about which beam/spatial filter is being used/selected. In one example, individual reference signals are transmitted by applying individual beams (spatial filters). Thus, the term "beam" or "beam information" may be represented by reference signal resource index(es).

DCI: DCI stands for downlink control information and there are various DCI formats used in the PDCCH. The DCI format is a predefined format in which the downlink control information is packed/formed and transmitted in the PDCCH.

TCI state: a TCI state contains parameters for configuring a QCL relationship between one or two DL reference signals and a target reference signal set. For example, a target reference signal set may be the DM-RS ports of PDSCH or PDCCH.

HARQ: is a functionality that ensures delivery between peer entities at Layer 1 (e.g., PHY Layer). A single HARQ process may support one TB when the PHY layer is not configured for DL/UL spatial multiplexing. A single HARQ process may support one or multiple TBs when the PHY layer is configured for DL/UL spatial multiplexing. There may be one HARQ entity per serving cell. Each HARQ entity may support parallel processing of (e.g., multiple) DL and UL HARQ processes.

In the 3GPP Rel-16 NR, multi-TRP based PDSCH repetition may be applied for URLLC purpose. The reliability of PDSCH transmission under multi-TRP scenario is enhanced by PDSCH repetition. Based on the development of PDSCH enhancement in multi-TRP, the enhancement of other physical channels (e.g., PUSCH, PDCCH, PUCCH) is to be discussed in the 3GPP Rel-17.

For PUSCH, two types of transmission modes are supported in NR, namely codebook (CB) based and non-codebook (non-CB) based transmissions. CB-based UL transmission has been developed for several years in commercial communication systems, e.g., wideband code division multiple access (WCDMA), LTE, and NR. Basically, the operation of CB-based UL transmission depends on the NW indications on transmission parameters. For example, transmit rank indication (TRI) and TPMI are frequently adopted as signaling content. Both TRI and TPMI may be associated with a set of SRS resources, which are used for channel sounding. In NR, since there is possibility of having multiple sets of SRS resources, an SRI field may be indicated by the BS to indicate an SRS resource set with which TRI and/or TPMI is associated.

Different from CB-based PUSCH transmission, for non-CB based PUSCH transmission, the UE may determine its PUSCH precoder and transmission rank based on the SRI directly. The SRI may be given by DCI or a higher layer parameter (e.g., srs-ResourceIndicator). For training the PUSCH precoder, usage of an SRS resource set may be set to "noncodebook" for such a purpose. The UE may test some candidate precoders by non-CB SRS resource transmission. The UE may derive the candidate precoders based on DL measurements on an associated Non-Zero Power (NZP) CSI-RS.

No matter CB or non-CB based PUSCH transmission is applied for multi-TRP based operation, UL power control is needed. To provide a precise and effective UL power control indication, a gNB may acquire the power headroom report (PHR) reporting transmitted by a device. The PHR may indicate how much transmission power left for a UE to use in addition to the power being used by current data transmission.

PUSCH enhancement in multi-TRP scenario for URLLC services will likely be discussed in the 3GPP Rel-17 NR. Similar to PDSCH enhancement in Rel-16, the Rel-17 PUSCH enhancement may also utilize repetition mechanisms to increase transmission reliability, with different repetitions targeting at different TRPs. For these repetition mechanisms, most of transmit parameters (e.g., TPMI, MCS, TPC, SRI, and so on) are carried in a single scheduling DCI for informing the UE how to perform transmission for individual repetitions (or transmission occasions). Among these parameters, the power control related parameters may be determined according to the PHR. The common PHR may only report PH calculation for one PUSCH repetition transmitted toward one BS. In a multi-TRP scenario, different PUSCH repetitions included in one repetitive PUSCH transmission are transmitted toward different TRPs. The different TRPs may or may not be located in different geographical positions. In such scenario, the common PHR may not be applicable since the common PHR only reports the PH calculation for one PUSCH repetition transmitted toward one TRP. Thus, the gNB may not be able to acquire the PH information of the other PUSCH repetitions transmitted toward the other TRPs. To provide reliable and exact power control related parameter, multiple PHs of different PUSCH repetitions transmitted toward different TRPs are needed. Therefore, how to design an applicable PHR for the multi-TRP scenario will be addressed in the present disclosure.

Unless otherwise specified, RRC parameters or special terms mentioned in the present disclosure may refer to 3GPP TS 38.211 V16.6.0, TS 38.212 V16.6.0, TS 38.213 V16.6.0, TS 38.214 V16.6.0, TS 38.321 V16.5.0, TS 38.331 V16.5.0.

PHR(s) associated with different PUSCH transmissions toward different TRPs may be carried in a MAC CE or multiple MAC CEs. The PH(s) may be calculated based on actual (or real) transmission or reference format. FIG. 1 is a diagram 100 illustrating PHR transmissions in multi-TRP based PUSCH transmission enabled with repetitions, according to an example implementation of the present disclosure. UE 110 is configured with multi-TRP based PUSCH repetitions. UE 110 communicates with TRP #1 112 and TRP #2 114. In some implementations, TRP #1 112 and TRP #2 114 may be associated with a serving cell of a BS. For example, TRP #1 112 and TRP #2 114 may correspond to different remote radio heads (RRHs) of a BS. In some implementations, TRP #1 112 may be associated with a first SRS resource set configured by the BS, and TRP #2 114 may be associated with a second SRS resource set configured by the BS. In some implementations, TRP #1 112 and TRP #2 114 may correspond to two different base stations.

For multi-TRP based PUSCH transmission, UE 110 may utilize a repetition mechanism and alternate UL transmission between TRP #1 112 and TRP #2 114. For example, in some implementations, UE 110 may perform PUSCH transmission in an order of {TRP #1 112, TRP #2 114, TRP #1 112, TRP #2 114, . . . }. In some other implementations, UE 302 may perform PUSCH transmission in an order of {TRP #1 112, TRP #1 112, TRP #2 114, TRP #2 114, . . . }. As illustrated in FIG. 1, the multi-TRP based PUSCH transmission is enabled with repetitive transmission occasions Rep. #1, Rep. #2, Rep. #3, Rep, #4 in slot #1, slot #2, slot #3, slot #4, respectively. PUSCH transmissions Rep. #1 and Rep. #3 may correspond to TRP #1 112. PUSCH transmissions Rep. #2 and Rep. #4 may correspond to TRP #2 114. One or more PUSCH repetitions may also be referred to as one or more PUSCH transmission occasions. For example, Rep. #1, Rep. #2, Rep. #3, Rep, #4 may be referred to as PUSCH transmission occasions #1, #2, #3, and #4, respectively.

UE 110 may transmit, to the BS, a MAC CE 120 including a first PH and a second PH. The first PH may be associated with transmission(s) between UE 110 and TRP #1 112, and the second PH may be associated with transmission(s) between UE 110 and TRP #2 114. MAC CE 120 may be also referred to as a PHR MAC CE in the present disclosure. The first PH may be calculated based on a time slot (e.g., slot #1) used for transmitting a PUSCH. In this case, the first PH may be calculated based on an actual transmission. The first PH is for an actual PUSCH transmission associated with TRP #1 112. On the contrary, the second PH may be calculated based on a time slot (e.g., slot #2) after the time slot used for transmitting the PUSCH. In this case, the second PH may be calculated based on a reference format. Calculation of a PH based on a reference format may be based on parameters configured via higher layer signaling. The second PH is for a reference PUSCH transmission associated with TRP #2 114. For example, the second PH is calculated and transmitted to the BS in slot #1, but the calculation of the second PH is based on slot #2. In some implementations, UE 110 may transmit MAC CE 120 in the first slot (e.g., slot #1) for the PUSCH transmissions Rep. #1 and Rep. #3 corresponding to TRP #1 112. In the present disclosure, a PH calculated based on the actual transmission may be referred to as an actual PH, while a PH calculated based on the reference format may be referred to as a virtual PH.

The multi-TRP operation and/or single-TRP operation may be applied for PUSCH transmissions. For a multi-TRP operation, PUSCH repetitions (or PUSCH transmission occasions) may be transmitted by a beam (or spatial relation) indicated to the transmissions toward different TRPs. A first beam and a second beam may be used for the multi-TRP PUSCH transmission. For example, the first beam (or first spatial relation) may be applied for PUSCH transmissions toward TRP #1 112, and the second beam (or second spatial relation) may be applied for PUSCH transmissions toward TRP #2 114. UE 110 may apply a first SRS resource set during the PUSCH transmissions toward TRP #1 112 and apply a second SRS resource set during the PUSCH transmissions toward TRP #2 114.

Different beam mapping patterns may be applied for the multi-TRP operation. An RRC parameter may indicate which beam mapping pattern is used for the multi-TRP operation. These beam mapping patterns may include cyclic beam mapping pattern, sequential beam mapping pattern and half-half beam mapping pattern.

Figure 2:
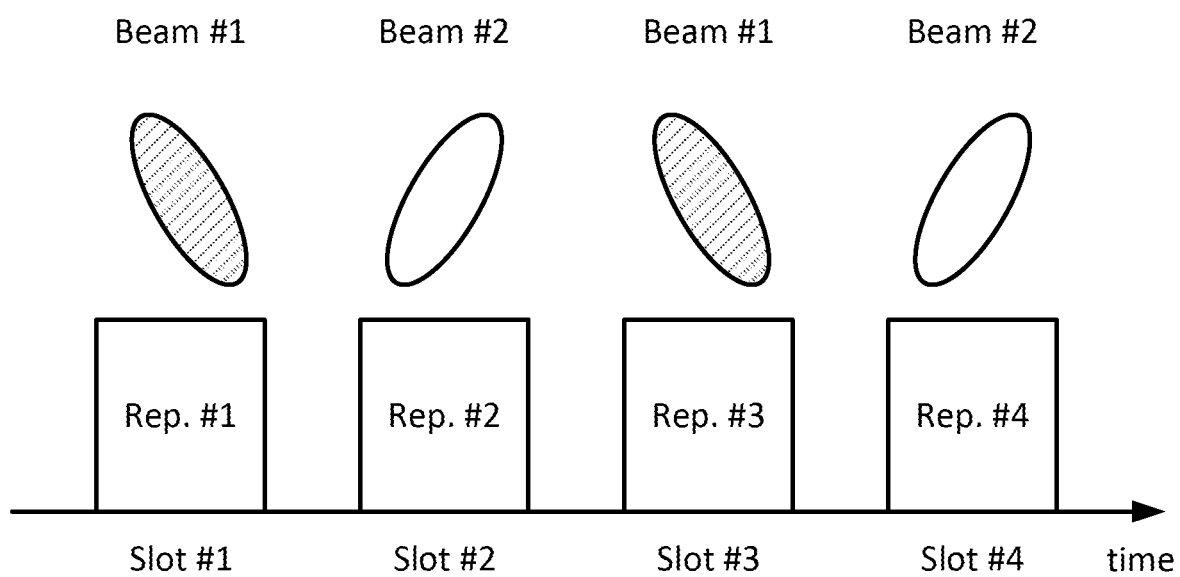
FIG. 2 is a diagram illustrating a cyclic beam mapping pattern for a multi-TRP operation, according to an example implementation of the present disclosure.

For the cyclic beam mapping pattern, the first and second beams (or spatial relations) are applied to the first and second PUSCH repetitions (or PUSCH transmission occasions) respectively, and the same beam mapping pattern continues to the remaining PUSCH repetitions (or PUSCH transmission occasions). FIG. 2 is a diagram 200 illustrating a cyclic beam mapping pattern for a multi-TRP operation, according to an example implementation of the present disclosure. The first beam (e.g., beam #1) is applied to the first PUSCH repetition Rep. #1 in slot #1 and the third PUSCH repetition Rep. #3 in slot #3. The second beam (e.g., beam #2) is applied to the second PUSCH repetition Rep. #2 in slot #2 and the fourth PUSCH repetition Rep. #4 in slot #4. In some implementations, for the cyclic beam mapping pattern, the first beam and the second beam may be applied to the first slot (e.g., slot #1) and the second slot (e.g., slot #2) of K (where K is a positive integer greater than 1) consecutive slots used for transmitting a plurality of PUSCH repetitions, respectively. The same beam mapping pattern may continue to the remaining slots of K consecutive slots (e.g., the first beam in slot #3 and the second beam in slot #4).

Figure 3:
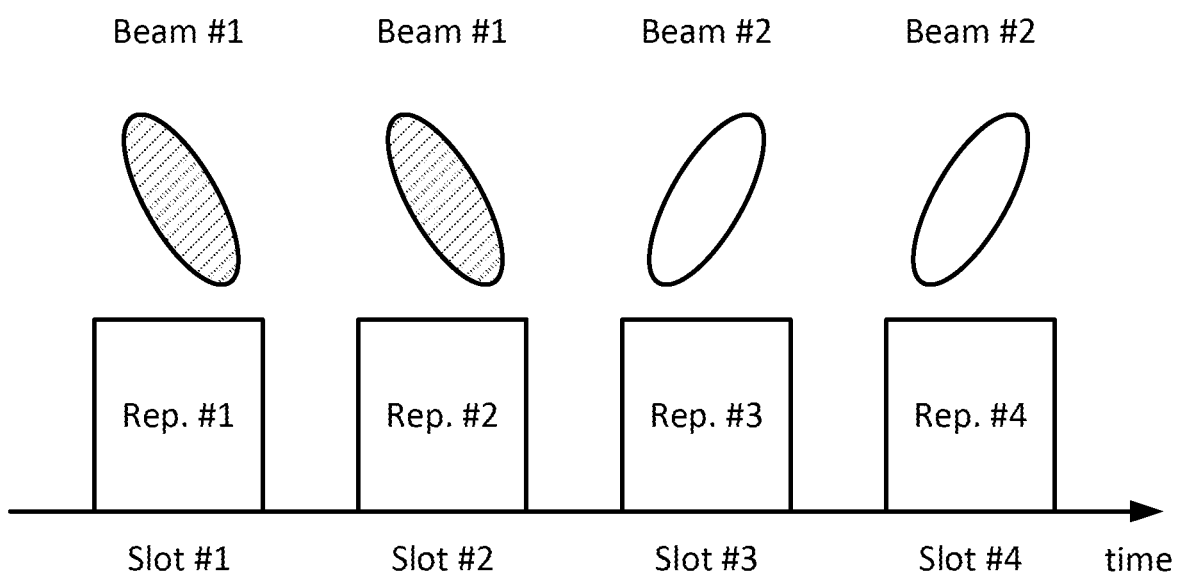
FIG. 3 is a diagram illustrating a sequential beam mapping pattern for a multi-TRP operation, according to an example implementation of the present disclosure.

For a sequential beam mapping pattern, the first beam (or spatial relation) is applied to the first and second PUSCH repetitions (or PUSCH transmission occasions), and the second beam (or spatial relation) is applied to the third and fourth PUSCH repetitions (or PUSCH transmission occasions), and the same beam mapping pattern continues to the remaining PUSCH repetitions (or PUSCH transmission occasions). FIG. 3 is a diagram 300 illustrating a sequential beam mapping pattern for a multi-TRP operation, according to an example implementation of the present disclosure. The first beam (e.g., beam #1) is applied to the first PUSCH repetition Rep. #1 in slot #1 and the second PUSCH repetition Rep. #2 in slot #2. The second beam (e.g., beam #2) is applied to the third PUSCH repetition Rep. #3 in slot #3 and the fourth PUSCH repetition Rep. #4 in slot #4. In some implementations, for sequential beam mapping pattern, the first beam may be applied to the first slot (e.g., slot #1) and the second slot (e.g., slot #2) of K (where K is a positive integer greater than 1) consecutive slots used for transmitting a plurality of PUSCH repetitions. The second beam may be applied to the third slot (e.g., slot #3) and the fourth slot (e.g., slot #4) of the K consecutive slots. The same beam mapping pattern may continue to the remaining slots of K consecutive slots, if any. For example, if K is 8, the first beam may be applied to slot #5 and slot #6, and the second beam may be applied to slot #7 and slot #8.

For a half-half beam mapping pattern, the first beam (or spatial relation) is applied to the first half of PUSCH repetitions (or PUSCH transmission occasions), and the second beam (or spatial relation) is applied to the second half of PUSCH repetitions (or PUSCH transmission occasions). In the present disclosure, a beam may be referred to as a TCI, a QCL, an SRI or a spatial filter. A beam may be also replaced with a TPMI, a precoder or a spatial relation.

As illustrated in FIG. 1, in one implementation, two PUSCH repetitions (or PUSCH transmission occasions) Rep. #1 and Rep. #3 may be transmitted by the beam (or spatial relation) indicated to the transmissions toward TRP #1 112 and the other two PUSCH repetitions (or PUSCH transmission occasions) Rep. #2 and Rep. #4 may be transmitted by the beam (or spatial relation) indicated to the transmissions toward TRP #2 114. TRP #1 112 may be associated with a first spatial relation information, and TRP #2 114 may be associated with a second spatial relation information. For a single-TRP operation, all PUSCH repetitions (or PUSCH transmission occasions) may be only transmitted by a beam (or spatial relation) indicated to the transmissions toward one TRP.

Types of PHs Used for Multi-TRP Based PUSCH Transmissions

Four categories of PHs are identified in NR for providing different information to a serving gNB.

Type-1 PH: This type of PH is used to provide the difference between the nominal UE maximum transmit power and the estimated power for PUSCH transmission per activated serving cell.

Type-2 PH: This type of PH is used to provide the difference between the nominal UE maximum transmit power and estimated power for PUSCH and PUCCH transmission on special cell (SpCell) of the other MAC entity.

Type-3 PH: This type of PH is used to provide the difference between the nominal UE maximum transmit power and the estimated power for SRS transmission per activated serving cell.

Maximum Permissible Exposure (MPE) Power Management Maximum Power Reduction (P-MPR): This type of PH is used to provide the power backoff to meet the MPE frequency range 2 (FR2) requirement for a serving cell operation on FR2.

To support PHR in multi-TRP based PUSCH transmission, one or more new types of PH may be defined or the existing type of PH may be reused. Whether a newly defined PH or an existing type of PH is adopted, the PH may provide at least one of following information:

The difference between the nominal UE maximum transmit power and the estimated power for different PUSCH transmissions per activated Serving Cell.

The difference between the nominal UE maximum transmit power and estimated power for PUSCH transmissions toward different TRPs.

In some implementations, the first PH and the second PH included in MAC CE 120 in FIG. 1 may be the Type-1 PH. For example, the first PH is a first Type-1 PH associated with the first PUSCH transmission toward TRP #1 112, and the second PH is a second Type-1 PH associated with the second PUSCH transmission toward TRP #2 114.

In some implementations, if a DCI indicates to a UE to switch to the single-TRP based PUSCH transmission, the UE may perform the Type-1 PHR.

RRC Configurations for PHR

In some implementations, one or more RRC parameters except following RRC parameters used for common PHR (e.g., phr-PeriodicTimer, phr-ProhibitTimer, phr-Tx-PowerFactorChange, phr-Type2OtherCell, phr-ModeOtherCG, multiplePHR, mpe-Reporting-FR2, mpe-ProhibitTimer and mpe-Threshold) may be configured or indicated. The one or more RRC parameters may be applied for the PHR for the multi-TRP based PUSCH transmission.

An RRC configuration for PHR may include an RRC parameter related to a triggering condition for transmission of a PHR MAC CE. Channel variation (e.g., path loss) may be one of the essential factors to determine whether to trigger a PHR or not. In some implementations, a set of RRC parameters (e.g., phr-Tx-PowerFactorChange1 and phr-Tx-PowerFactorChange2) may indicate threshold values for the channel variation (e.g., path loss) for the different PUSCH transmissions toward different TRPs. The different PUSCH transmissions may carry the same TB. A first RRC parameter (e.g., phr-Tx-PowerFactorChange1) may indicate threshold values for the path loss of the PUSCH transmission toward a first TRP for determining whether a PHR is triggered or not. A second RRC parameter (e.g., phr-Tx-PowerFactorChange2) may indicate threshold values for the path loss of the PUSCH transmission toward a second TRP for determining whether a PHR is triggered or not.

In some implementations, a UE may perform a dual-TRP based PUSCH transmission, where one or more PUSCH transmission occasions are scheduled. The one or more PUSCH transmission occasions may be scheduled to transmit the same TB. One UL beam (e.g., a first beam) may be used to transmit some of the one or more PUSCH transmission occasions and another UL beam (e.g., a second beam) may be used to transmit the others of the one or more PUSCH transmission occasions. phr-Tx-PowerFactorChange1 dB may indicate the threshold values for the channel variation (e.g., path loss) corresponding to the first PUSCH repetition transmitted by the first beam (or first spatial relation) indicated to perform PUSCH transmission to one TRP. phr-Tx-PowerFactorChange2 dB may indicate the threshold values for the channel variation (e.g., path loss) for the second PUSCH repetition transmitted by the second beam (or second spatial relation) indicated to perform PUSCH transmission to another TRP. A PHR may be triggered by at least one of the following conditions:

The path loss corresponding to the first PUSCH repetition transmitted by the first beam (or first spatial relation) indicated to perform PUSCH transmission is larger than and/or has changed more than phr-Tx-PowerFactorChange1 dB and the path loss corresponding to the first PUSCH repetition transmitted by the second beam (or second spatial relation) indicated to perform PUSCH transmission is larger than and/or has changed more than phr-Tx-PowerFactorChange2 dB.

The path loss corresponding to the first PUSCH repetition transmitted by the first beam (or first spatial relation) indicated to perform PUSCH transmission is larger than and/or has changed more than phr-Tx-PowerFactorChange1 dB or the path loss corresponding to the first PUSCH repetition transmitted by the second beam (or second spatial relation) indicated to perform PUSCH transmission is larger than and/or has changed more than phr-Tx-PowerFactorChange2 dB.

The path loss corresponding to the first PUSCH repetition transmitted by the first beam (or first spatial relation) indicated to perform PUSCH transmission is larger than and/or has changed more than phr-Tx-PowerFactorChange1 dB.

The path loss corresponding to the first PUSCH repetition transmitted by the second beam (or spatial relation) indicated to perform PUSCH transmission is larger than and/or has changed more than phr-Tx-PowerFactorChange2 dB.

The first beam and the second beam may follow a transmission order. The transmission order may be indicated by a DCI field. The DCI field may be a field used for indicating switching between single-TRP and multi-TRP operations. For example, the UE is configured two beams (e.g., beam M and beam N) for multi-TRP based PUSCH transmission. The DCI field used for indicating switching between single-TRP and multi-TRP operations may indicate whether {beam M, beam N} corresponds to {the first beam, the second beam} or {the second beam, the first beam}. For another example, the UE is configured two spatial relations (e.g., transmission precoder or spatial Tx parameter/filter) by the DCI for multi-TRP based PUSCH transmission. The DCI field used for indicating switching between single-TRP and multi-TRP operations may indicate whether {spatial relation M, spatial relation N} corresponds to (the first spatial relation, the second spatial relation) or (the second spatial relation, the first spatial relation).

In some implementations, multiple RRC parameters (e.g., phr-Tx-PowerFactorChange1 and phr-Tx-PowerFactorChange2) may indicate the threshold values for the channel variation (e.g., path loss) for different PUSCH transmission toward different TRPs. If the DCI field used for indicating switching between multi-TRP and single-TRP operation indicates switching to single-TRP operation, which RRC parameter (e.g., phr-Tx-PowerFactorChange1 or phr-Tx-PowerFactorChange2) would be used as the threshold value may also depend on the DCI field. In some implementations, if the DCI field indicates switching to single-TRP operation and the first beam1 (or first spatial relation) is applied for PUSCH transmission, the phr-Tx-PowerFactorChange1 may be used as the threshold value. If the DCI field indicates switching to single-TRP operation and the second beam (or second spatial relation) is applied for PUSCH transmission, the phr-Tx-PowerFactorChange2 may be used as the threshold value.

For the common PHR, the PH may be calculated based on the actual transmission or reference format. PH calculated based the actual transmission may be referred to as "actual" and PH calculated based on the reference format may be referred to as "virtual." An RRC parameter may be used to indicate whether the PH calculation is based on actual PUSCH transmission (e.g., actual) or reference format (e.g., virtual). Since multi-TRP based PHR may need to report multiple PHs corresponding to different PUSCH repetitions transmitted toward different TRPs, whether these PHs are calculated based on the actual transmission or reference format may be determined according to at least one of following:

- Multiple RRC parameters (e.g., phr-Mode1 and phr-Mode2) may be used to indicate whether each PH calculation is based on actual transmission or reference format.
- One PH may always be calculated based on actual transmission. An RRC parameter (e.g., phr-ModeOtherTx) may be used to indicate whether the other PH calculation is based on actual transmission or reference format.
- One PH may always be calculated based on actual transmission. An RRC parameter may be used to indicate which beam mapping pattern is applied for multi-TRP based PUSCH transmission. The RRC parameter may be also used to indicate whether the other PH calculation is based on actual transmission or reference format. In some implementations, if a cyclic beam mapping pattern is configured to perform multi-TRP based PUSCH transmissions, the other PH calculation may be based on actual transmission. If a sequential beam mapping pattern is configured to perform multi-TRP based PUSCH transmissions, the other PH calculation may be based on reference format.
- An RRC parameter used to indicate the beam mapping pattern may be also used to inform the UE whether the multiple PHs are calculated based on actual transmission or reference format. In some implementations, if the cyclic beam mapping pattern is configured to the UE for performing multi-TRP based PUSCH transmission, the RRC parameter may also inform the UE that each PH is calculated based on actual transmission. If the sequential beam mapping pattern is configured to the UE for performing multi-TRP based PUSCH transmission, the RRC parameter may also inform the UE that one PH is calculated based on actual transmission and the other PH is calculated based on reference format.
- An RRC parameter may be used to determine whether each PH is calculated based on actual transmission or reference format. In some implementations, the RRC parameter may indicate a case that the first PH is calculated based on actual transmission and the second PH is calculated based on actual transmission, or a case that the first PH is calculated based on actual transmission and the second PH is calculated based on reference format, or a case that the first PH is calculated based on reference format and the second PH is calculated based on reference format. The RRC parameter may be a new RRC parameter or an existing RRC parameter (e.g., phr-ModeOtherCG).

In some implementations, one or more existing RRC parameters used for common PHR (e.g., phr-PeriodicTimer, phr-ProhibitTimer, phr-Tx-PowerFactorChange, phr-Type2OtherCell, phr-ModeOtherCG, multiplePHR, mpe-Reporting-FR2, mpe-ProhibitTimer and mpe-Threshold) may be configured or indicated. The one or more RRC parameters may be applied for the PHR for the multi-TRP based PUSCH transmissions.

An RRC configuration for PHR may include an RRC parameter related to a triggering condition for transmission of a PHR MAC CE. In some implementations, for a multi-TRP based PHR operation, the RRC parameter related to the triggering condition for transmission of the PHR MAC CE may apply to both the first TRP and the second TRP.

Channel variation (e.g., path loss) may be one of the essential factors to determine whether to trigger PHR or not. In some implementations, the RRC parameter may include a threshold of channel variation for the first TRP and the second TRP. Since multi-TRP based PHR may need to report multiple PHs, an existing RRC parameter (e.g., phr-Tx-PowerFactorChange) may indicate threshold values for the channel variation (e.g., path loss) for the different PUSCH transmissions toward different TRPs. The RRC parameter (e.g., phr-Tx-PowerFactorChange) may indicate the threshold values for the path loss of the each PUSCH transmission toward different TRPs for determining whether a PHR is triggered or not.

In some implementations, the RRC parameter related to the triggering condition for transmission of the PHR MAC CE may include a prohibit timer (e.g., phr-ProhibitTimer) for the transmission of the PHR MAC CE. Some examples of triggering PHR according to phr-Tx-PowerFactorChange and phr-ProhibitTimer are disclosed.

- If phr-ProhibitTimer expires or has expired and the path loss of one of all PUSCH transmissions (occasion(s)) toward different TRPs is larger than and/or has changed more than the phr-Tx-PowerFactorChange dB, the PHR may be triggered.
- If phr-ProhibitTimer expires or has expired and all path losses of all PUSCH transmissions toward different TRPs are larger than and/or have changed more than the phr-Tx-PowerFactorChange dB, the PHR may be triggered.
- If phr-ProhibitTimer expires or has expired and the path loss calculated by the actual PUSCH transmissions is larger than and/or has changed more than the phr-Tx-PowerFactorChange dB, the PHR may be triggered.

In some implementations, the number of PHs reported to a gNB may depend on an RRC parameter that indicates whether DCI includes one TPC field or two TPC fields.

In some implementations, if the RRC parameter indicates that the DCI includes two TPC fields, two PHs may be calculated. If the RRC parameter indicates that the DCI only includes one TPC field, there may be only one PH required to be calculated. In some implementations, the only one PH to be calculated may be the PH corresponding to the first PUSCH repetition transmitted by the first beam (or first spatial relation). In some implementations, the only PH to be calculated may be the PH corresponding to the first PUSCH repetition transmitted by the second beam (or second spatial relation). In some implementations, it may be up to UE implementation to determine whether the only PH to be calculated is the PH corresponding to the first PUSCH repetition transmitted by the first beam (or first spatial relation) or the PH corresponding to the first PUSCH repetition transmitted by the second beam (or second spatial relation).

In one example, the RRC parameter indicates that the DCI includes two TPC fields. Two RRC parameters (e.g., PowerFactorChange1 and PowerFactorChange2) are configured as threshold values for path loss of different PUSCH repetitions transmitted toward different TRPs.

If the DCI field used for switching between multi-TRP and single-TRP operations indicates a multi-TRP operation and the transmission order of PUSCH transmissions is {first beam, second beam} or {first spatial relation, second spatial relation}, PowerFactorChange1 may be the threshold value of the path loss of the PUSCH transmitted by the first beam (or first spatial relation), and/or PowerFactorChange2 may be the threshold value of the path loss of the PUSCH transmitted by the second beam (or second spatial relation).

If the DCI field used for switching between multi-TRP and single-TRP operations indicates multi-TRP operation and the transmission order of PUSCH transmissions is {second beam, first beam} or {second spatial relation, first spatial relation}, PowerFactorChange1 may be the threshold value of the path loss of the PUSCH transmitted by the second beam (or second spatial relation) and/or PowerFactorChange2 may be the threshold value of the path loss of the PUSCH transmitted by the first beam (or first spatial relation).

In one example, the RRC parameter indicates that the DCI only includes one TPC field. Two RRC parameters (e.g., PowerFactorChange1 and PowerFactorChange2) are configured as threshold values for path loss of different PUSCH repetitions transmitted toward different TRPs. In this example, only one of PowerFactorChange1 and PowerFactorChange2 may be used.

If the DCI field used for switching between multi-TRP and single-TRP operations indicates single-TRP operation and the beam (or spatial relation) used for PUSCH transmission is the first beam (or first spatial relation), PowerFactorChange1 may be used as the threshold value and PowerFactorChange2 may be absent.

If the DCI field used for switching between multi-TRP and single-TRP operations indicates single-TRP operation and the beam (or spatial relation) used for PUSCH transmission is the second beam (or second spatial relation), PowerFactorChange2 may be used as the threshold value and PowerFactorChange1 may be absent.

If the DCI field used for switching between multi-TRP and single-TRP operations indicates single-TRP operation, it may be up to UE implementation to determine whether applying PowerFactorChange1 or PowerFactorChange2 as the threshold value.

The first beam (or first spatial relation) and the second beam (or second spatial relation) may follow a transmission order indicated by the DCI field used for indicating switching between multi-TRP and single-TRP operations. For example, the UE is configured with two beams (e.g., beam M and beam N) for multi-TRP based PUSCH transmissions. The DCI field used for indicating switching between single-TRP and multi-TRP operations may indicate whether {beam M, beam N} corresponds to {the first beam, the second beam} or {the second beam, the first beam}. In another example, the UE is configured with two spatial relations (e.g., transmission precoders or spatial Tx parameters/filters) by the DCI for multi-TRP based PUSCH transmissions. The DCI field used for indicating switching between single-TRP and multi-TRP operations may indicate whether {spatial relation M, spatial relation N} corresponds to (the first spatial relation, the second spatial relation) or (the second spatial relation, the first spatial relation).

In some implementations, the number of PHs reported to the gNB may be related to a DCI field that indicates switching between multi-TRP and single-TRP operations.

In some implementations, if the DCI indicates staying in multi-TRP operation, two PHs may be required to be calculated. If the DCI indicates switching to single-TRP operation, there may be only one PH required to be calculated. In some implementations, the only one PH to be calculated may be the PH corresponding to the first PUSCH repetition transmitted by the first beam (or first spatial relation). In some implementations, the only PH to be calculated may be the PH corresponding to the first PUSCH repetition transmitted by the second beam (or second spatial relation). In some implementations, it may be up to UE implementation to determine whether the only PH to be calculated is the PH corresponding to the first PUSCH repetition transmitted by the first beam (or first spatial relation) or the PH corresponding to the first PUSCH repetition transmitted by the second beam (or second spatial relation).

In some implementations, if the RRC parameter indicates that the DCI includes two TPC fields and the DCI indicates switching to single-TRP operation, which TPC field to be applied for PUSCH transmission may depend on which beam (or spatial relation) is indicated to perform a single-TRP operation. For example, two beams (or two spatial relations), e.g., the first beam (or first spatial relation) and the second beam (or second spatial relation), are applied for multi-TRP based PUSCH transmission. If the DCI indicates switching to single-TRP operation and applying the first beam (or first spatial relation) for PUSCH transmission, then the TPC field corresponding to the first beam (or first spatial relation) may only be used for single-TRP based PUSCH transmission.

In some implementations, a new RRC parameter may be used to indicate that a PHR MAC CE includes single PH associated with transmission between a UE and a TRP or multiple PHs associated with different transmissions between a UE and different TRPs. As illustrated in FIG. 1, UE 110 may receive an RRC configuration including the new RRC parameter from the BS. The new RRC parameter may indicate a first operation mode of multiple PHRs for multiple TRPs, including TRP #1 112 and TRP #2 114.

In some implementations, an existing RRC parameter (e.g., multiplePHR) may be used to indicate that a PHR MAC CE includes a single PH associated with a transmission between a UE and a TRP or multiple PHs associated with different transmissions between a UE and different TRPs, where different TRPs may be associated with different serving cells. The existing RRC parameter (e.g., multiplePHR) may indicate a second operation mode of multiple PHRs for multiple serving cells. As illustrated in FIG. 1, UE 110 may receive an RRC configuration including the existing RRC parameter (e.g., multiplePHR) from the BS. In some implementations, the RRC configuration received by UE 110 may include the new RRC parameter and the existing RRC parameter (e.g., multiplePHR), where the new RRC parameter indicates a first operation mode of multiple PHRs for multiple TRPs associated with a serving cell of the BS, and the existing RRC parameter (e.g., multiplePHR) indicates a second operation mode of multiple PHRs for multiple serving cells.

In some implementations, one PH may be reported by a UE when performing multi-TRP operation. Which PH is reported may be indicated/configured by an RRC parameter, a DCI field, or up to UE implementation.

In some implementations, an RRC parameter may indicate to the UE to report one PH associated with the transmission between the UE and a TRP.

The RRC parameter may indicate to the UE to report one PH when performing multi-TRP operation. The RRC parameter may also indicate to the UE whether the PH is associated with the TRP that the UE is indicated to use the first beam (or first spatial relation) with for PUSCH transmission or the TRP that the UE is indicated to use the second beam (or second spatial relation) with for PUSCH transmission.

The RRC parameter may indicate to the UE to report one PH when performing multi-TRP operation. A DCI field used for switching between single-TRP and multi-TRP operations may indicate to the UE whether the PH is associated with the TRP that the UE is indicated to use the first beam (or first spatial relation) with for PUSCH transmission or the TRP that the UE is indicated to use the second beam (or second spatial relation) with for PUSCH transmission.

The RRC parameter may indicate to the UE to report one PH when performing multi-TRP operation. It may be up to UE implementation to determine whether the PH is associated with the TRP that the UE is indicated to use the first beam (or first spatial relation) with for PUSCH transmission or the TRP that the UE is indicated to use the second beam (or second spatial relation) with for PUSCH transmission.

In some implementations, a DCI field may indicate to the UE to report one PH associated with the transmission between the UE and a TRP.

The DCI field may indicate to the UE to report one PH when performing multi-TRP operation. The DCI field used for switching between single-TRP and multi-TRP operations may also indicate to the UE whether the PH is associated with the TRP that the UE is indicated to use the first beam (or first spatial relation) with for PUSCH transmission or the TRP that the UE is indicated to use the second beam (or second spatial relation) with for PUSCH transmission. In some implementations, if the DCI field indicates switching to single-TRP operation, the DCI field may also indicate that only one PH may be reported.

In some implementations, the UE may report the PH that has the largest path loss.

In some implementations, multiple PHs may be reported by a UE when performing multi-TRP operation. Multiple PHs may be included/carried in a multi-entry PHR MAC CE or multiple single-entry PHR MAC CEs.

In some implementations, multiple PHs may be carried in a multi-entry PHR MAC CE. In addition, multiple MPEs may be associated with different transmissions between the UE and different TRPs. The multi-entry PHR MAC CE may include multiple PHs/MPEs, where each PH/MPE may correspond to one TRP. The order of PHs/MPEs in the multi-entry PHR MAC CE may be indicated by a DCI field used for switching between single-TRP and multi-TRP operations.

If the transmission order indicated by the DCI field is the first beam (or first spatial relation) used for transmission toward the first TRP and then the second beam (or second spatial relation) used for transmission toward the second TRP, the order of PHs/MPEs in the multi-entry PHR MAC CE may be the PH/MPE associated with the transmission between the UE and the first TRP first and then the PH/MPE associated with the transmission between the UE and the second TRP. If the transmission order indicated by the DCI field is the second beam (or second spatial relation) and then the first beam (or first spatial relation), the order of PHs/MPEs in the multiple entry PHR MAC CE may be the PH/MPE associated with the second TRP and then the PH/MPE associated with the first TRP.

In some implementations, multiple PHs may be carried in multiple single-entry PHR MAC CEs. The transmission order of PHRs may be associated with the PUSCH transmission order indicated by the DCI field used for switching between single-TRP and multi-TRP operations.

If the transmission order indicated by the DCI field is the first beam (or first spatial relation) used for transmission toward the first TRP and then the second beam (or second spatial relation) used for transmission toward the second TRP, when the cyclic beam mapping pattern is configured, the first slot, which is used to transmit the first PUSCH repetition (or first PUSCH occasion), may be used to transmit a single-entry PHR MAC CE including the first PH/MPE associated with the transmission between the UE and the first TRP. The second slot, which is used to transmit the second PUSCH repetition (or second PUSCH occasion), may be used to transmit another single-entry PHR MAC CE including the second PH/MPE associated with the transmission between the UE and the second TRP.

If the transmission order indicated by the DCI field is the first beam (or first spatial relation) and then the second beam (or second spatial relation), when the sequential beam mapping pattern is configured, the first slot, which is used to transmit the first PUSCH repetition (or first PUSCH occasion), may be used to transmit a single-entry PHR MAC CE including the first PH/MPE associated with the transmission between the UE and the first TRP. The third slot, which is used to transmit the third PUSCH repetition (or third PUSCH occasion), may be used to transmit another single-entry PHR MAC CE including the second PH/MPE associated with the transmission between the UE and the second TRP.

If the transmission order indicated by the DCI field is the first beam (or first spatial relation) and then the second beam (or second spatial relation), when the sequential beam mapping pattern is configured and the number of repetitions is configured as 2, the first slot, which is used to transmit the first PUSCH repetition (or first PUSCH occasion), may be used to transmit a single-entry PHR MAC CE including the first PH/MPE associated with the transmission between the UE and the first TRP. The second slot, which is used to transmit the second PUSCH repetition (or second PUSCH occasion), may be used to transmit another single-entry PHR MAC CE including the second PH/MPE associated with the transmission between the UE and the second TRP.

If the transmission order indicated by the DCI field is the second beam (or second spatial relation) and then the first beam (or first spatial relation), when the cyclic beam mapping pattern is configured, the first slot, which is used to transmit the first PUSCH repetition (or first PUSCH occasion), may be used to transmit a single-entry PHR MAC CE including the second PH/MPE associated with the transmission between the UE and the second TRP. The second slot, which is used to transmit the second PUSCH repetition (or second PUSCH occasion), may be used to transmit another single-entry PHR MAC CE including the first PH/MPE associated with the transmission between the UE and the first TRP.

If the transmission order indicated by the DCI field is the second beam (or second spatial relation) and then the first beam (or first spatial relation), when the sequential beam mapping pattern is configured, the first slot, which is used to transmit the first PUSCH repetition (or first PUSCH occasion), may be used to transmit a single-entry PHR MAC CE including the second PH/MPE associated with the transmission between the UE and the second TRP. The third slot, which is used to transmit the third PUSCH repetition (or third PUSCH occasion), may be used to transmit another single-entry PHR MAC CE including the first PH/MPE associated with the transmission between the UE and the first TRP.

If the transmission order indicated by the DCI field is the second beam (or second spatial relation) and then the first beam (or first spatial relation), when the sequential beam mapping pattern is configured and the number of repetitions is configured as 2, the first slot, which is used to transmit the first PUSCH repetition (or first PUSCH occasion), may be used to transmit a single-entry PHR MAC CE including the second PH/MPE associated with the transmission between the UE and the second TRP. The second slot, which is used to transmit the second PUSCH repetition (or second PUSCH occasion), may be used to transmit another single-entry PHR MAC CE including the first PH/MPE associated with the transmission between the UE and the first TRP.

Resource(s) or Transmission Occasion(s) Used to Report PH(s)

PH(s) used for a multi-TRP based operation may be related to PUSCH transmission X and PUSCH transmission Y in an active UL BWP of a certain carrier of a serving cell, where the parameters X and Y may be related to the beam mapping pattern applied to the multi-TRP based PUSCH transmission. The multiple TRPs may be associated with the same serving cell. For example, the PH(s) may be valid for PUSCH transmission X and PUSCH transmission Y. The PH(s) may be transmitted on PUSCH transmission X and PUSCH transmission Y. The PH(s) may be calculated based on PUSCH transmission X and PUSCH transmission Y. A UE may be configured with a parameter N via RRC signaling for PUSCH transmission enabled with repetitions, where N indicates the number of PUSCH repetitions and is a positive integer greater than 1. For example, as illustrated in FIG. 1, N=4 and thus there are 4 PUSCH repetitions. The consecutive N PUSCH repetitions may be referred to as "one repetitive PUSCH transmission" in the present disclosure.

If a cyclic beam mapping is configured, X may be the first PUSCH occasion (e.g., the first PUSCH repetition in one repetitive PUSCH transmission) and Y may be the next PUSCH occasion (e.g., the second PUSCH repetition in one repetitive PUSCH transmission).

If a sequential beam mapping is configured, X may be the first PUSCH occasion (e.g., the first PUSCH occasion in one repetitive PUSCH transmission) and Y may be the third PUSCH occasion (e.g., the third PUSCH repetition in one repetitive PUSCH transmission).

If a sequential beam mapping is configured and the number of repetitions is 2, X may be the first PUSCH occasion (e.g., the first PUSCH repetition in one repetitive PUSCH transmission) and Y may be the second PUSCH occasion (e.g., the second PUSCH repetition in one repetitive PUSCH transmission).

In some implementations, X may be the first PUSCH occasion transmitted by the first beam (or the first spatial relation) indicated to transmit the PUSCH to one TRP and Y may be the first PUSCH occasion transmitted by the second beam (or the second spatial relation) indicated to transmit the PUSCH to another TRP.

PH(s) used for a multi-TRP based operation may be valid for PUSCH transmission X and PUSCH transmission Y in an active UL BWP of a certain carrier of serving cell. Whether the PHR MAC CE may be transmitted in the slot for PUSCH transmission X or the slot for PUSCH transmission Y may be related to at least one of following: an RRC parameter used to indicate the beam mapping pattern applied to multi-TRP based PUSCH transmission, an RRC parameter used to indicate whether the PH is calculated based on actual transmission or reference format, an RRC parameter used to indicate whether the DCI includes one TPC field or two TPC fields, and a DCI field used for switching between multi-TRP operation and single-TRP operation.

The RRC parameter may be used to indicate a beam mapping pattern for multi-TRP based PUSCH transmission.

If a cyclic beam mapping pattern is configured, the PHR MAC CE may be transmitted in the first slot used to transmit the first PUSCH repetition in one repetitive PUSCH transmission. As illustrated in FIG. 2, the PHR MAC CE may be transmitted in slot #1 according to at least one of following conditions: PH calculation corresponding to the PUSCH occasion transmitted by beam #1 is based on actual transmission and the PH calculation corresponding to the PUSCH occasion transmitted by beam #2 is based on reference format, the RRC parameter indicates that the DCI only includes one TPC field, or the DCI indicates switching to single-TRP based PUSCH transmission.

If a cyclic beam mapping pattern is configured, the PHR MAC CE may be transmitted in the first slot used to transmit the first PUSCH repetition in one repetitive PUSCH transmission. As illustrated in FIG. 2, the PHR MAC CE may be transmitted in slot #2 according to at least one of the following conditions: PH calculation corresponding to the PUSCH occasion transmitted by beam #1 is based on actual transmission and the PH calculation corresponding to the PUSCH occasion transmitted by beam #2 is also based on actual transmission, or the RRC parameter indicates that the DCI includes two TPC fields.

If a sequential beam mapping pattern is configured, the PHR MAC CE may be transmitted in the first slot used to transmit the first PUSCH repetition in one repetitive PUSCH transmission. As illustrated in FIG. 3, the PHR MAC CE may be transmitted in slot #1 according to at least one of the following conditions: PH calculation corresponding to the PUSCH occasion transmitted by beam #1 is based on actual transmission and the PH calculation corresponding to the PUSCH occasion transmitted by beam #2 is based on reference format, the RRC parameter indicates that the DCI only includes one TPC field, DCI indicates switching to single-TRP based PUSCH transmission, or the number of repetitions is configured or indicated to be 2.

If a cyclic beam mapping pattern is configured, the PHR MAC CE may be transmitted in the first slot used to transmit the first PUSCH repetition in one repetitive PUSCH transmission. As illustrated in FIG. 2, the PHR MAC CE may be transmitted in slot #3 according to at least one of following conditions: PH calculation corresponding to the PUSCH occasion transmitted by beam #1 is based on actual transmission and the PH calculation corresponding to the PUSCH occasion transmitted by beam #2 is also based on actual transmission, or the RRC parameter indicates that the DCI includes two TPC fields.

The RRC parameter used to indicate whether the PH is calculated based on actual transmission or reference format.

If both PHs are calculated based on actual transmission and the beam mapping pattern is configured as cyclic beam mapping pattern as illustrated in FIG. 2, the PHR MAC CE may be transmitted in slot #2.

If one PH is calculated based on actual transmission and another PH is calculated based on reference format, and the beam mapping pattern is configured as cyclic beam mapping pattern as illustrated in FIG. 2, the PHR MAC CE may be transmitted in slot #1.

If both PHs are calculated based on actual transmission and the beam mapping pattern is configured to be sequential beam mapping pattern as illustrated in FIG. 3, the PHR MAC CE may be transmitted in slot #3.

If one PH is calculated based on actual transmission and another PH is calculated based on reference format, and the beam mapping pattern is configured to be sequential beam mapping pattern as illustrated in FIG. 3, the PHR MAC CE may be transmitted in slot #1.

The RRC parameter used to indicate that the DCI includes one TPC field or two TPC fields. In some implementations, if the RRC parameter indicates that the DCI only includes on TPC field, the PHR MAC CE may be transmitted in the first slot used for PUSCH transmission.

Figure 4:
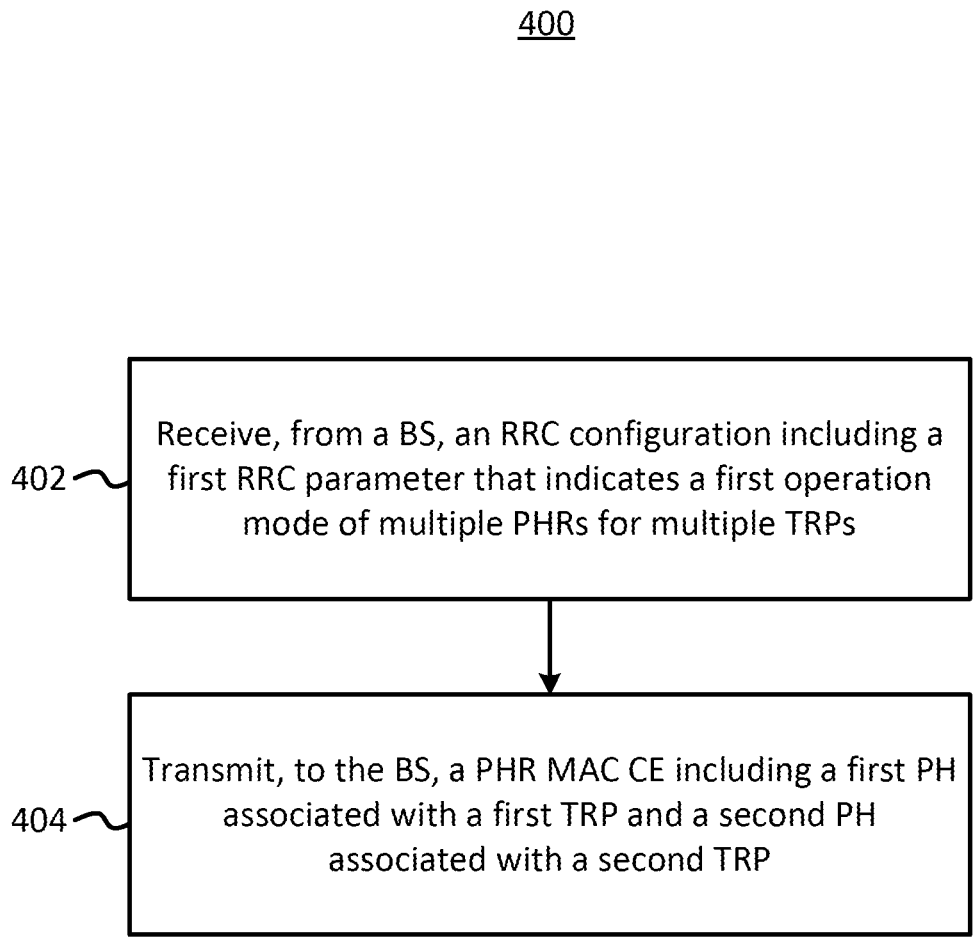
FIG. 4 is a flowchart illustrating a method/process performed by a UE for transmitting a PHR, according to an example implementation of the present disclosure.

FIG. 4 is a flowchart illustrating a method/process 400 performed by a UE for transmitting PHR, according to an example implementation of the present disclosure. In action 402, the UE may receive, from a BS, an RRC configuration including a first RRC parameter that indicates a first operation mode of multiple PHRs for multiple TRPs. In action 404, the UE may transmit, to the BS, a PHR MAC CE (e.g., MAC CE 120 in FIG. 1) including a first PH associated with a first TRP and a second PH associated with a second TRP. The first TRP and the second TRP may be associated with a serving cell of the BS. The first PH may be a first Type-1 PH associated with first PUSCH transmission toward the first TRP. The second PH may be a second Type-1 PH associated with second PUSCH transmission toward the second TRP. The UE may be configured with multi-TRP based PUSCH repetitions.

In some implementations, the first TRP may be associated with first spatial relation information (or a first beam, such as beam #1 in FIG. 2 and FIG. 3). The second TRP may be associated with second spatial relation information (or a second beam, such as beam #2 in FIG. 2 and FIG. 3).

In some implementations, the UE may transmit multiple PUSCH repetitions to the first TRP (e.g., Rep. #1, Rep. #3 in FIG. 2, Rep. #1, Rep. #2 in FIG. 3) and multiple PUSCH repetitions to the second TRP (e.g., Rep. #1, Rep. #2 in FIG. 2, Rep. #3, Rep. #4 in FIG. 3), where each of PUSCH repetitions to the first TRP and each of the PUSCH repetitions to the second TRP are in different slots. As illustrated in FIGS. 1-3, the PUSCH repetitions Rep. #1, Rep. #2, Rep. #3, Rep. #4 may carry a same TB and Rep. #1, Rep. #2, Rep. #3, Rep. #4 may be referred to as "one repetitive PUSCH transmission."

In some implementations, the PHR MAC CE may be transmitted in a first slot for the multiple PUSCH repetitions to the first TRP (e.g., slot #1 in FIG. 1, FIG. 2, and FIG. 3). The first PH may be for an actual PUSCH transmission associated with the first TRP. The second PH may be for a reference PUSCH transmission associated with the second TRP. For example, in FIGS. 1 and 2, the second PH may be calculated and transmitted in slot #1 but associated with the PUSCH repetition Rep. #2 in slot #2.

In some implementations, the RRC configuration received in action 402 may further include a second RRC parameter related to a triggering condition for transmission of the PHR MAC CE. The second RRC parameter may apply to the first TRP and the second TRP. The second parameter may be common to both the first TRP and the second TRP. In some implementations, the second RRC parameter may include a threshold of channel variation for the first TRP and the second TRP, such as phr-Tx-PowerFactorChange applicable to both the first TRP and the second TRP. In some implementations, the second RRC parameter includes a prohibit timer for the transmission of the PHR MAC CE, such as phr-ProhibitTimer. In some implementations, the second RRC parameter may include a threshold of channel variation for the first TRP and the second TRP and a prohibit timer for the transmission of the PHR MAC CE.

In some implementations, the RRC configuration received in action 402 may further include a third RRC parameter that indicates a second operation mode of multiple PHRs for multiple serving cells. In some implementations, the third RRC parameter for indicating the second operation mode may be an existing RRC parameter, such as multiplePHR. In some implementations, the first RRC parameter for indicating the first operation mode may be a newly defined RRC parameter. The second operation mode is for multiple PHRs for multiple serving cells, while the first operation mode is for multiple PHRs for multiple TRPs associated with a serving cell.

Figure 5:
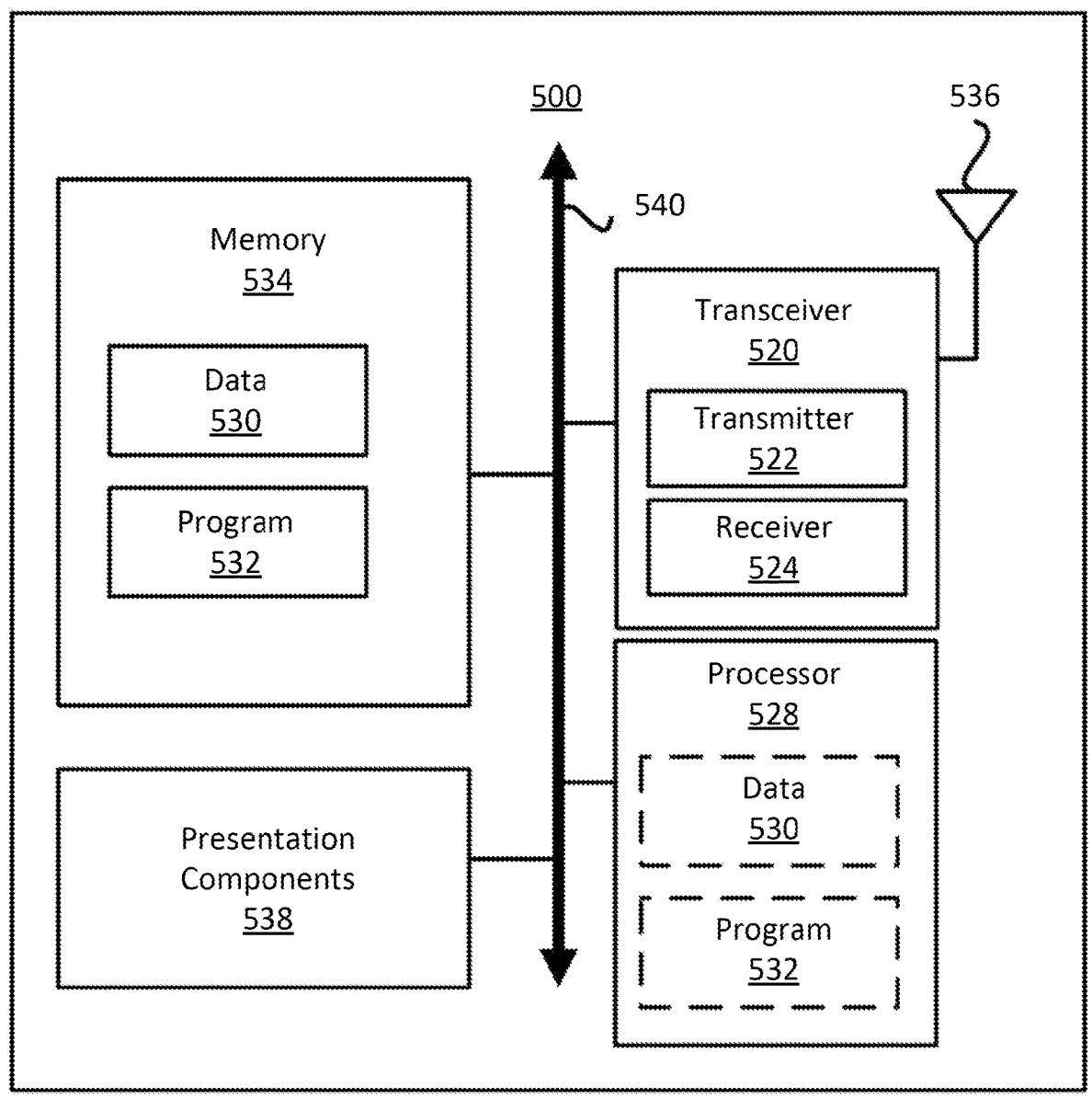
FIG. 5 is a block diagram illustrating a node for wireless communication, according to an example implementation of the present disclosure.

FIG. 5 is a block diagram illustrating a node 500 for wireless communication in accordance with various aspects of the present disclosure. As illustrated in FIG. 5, a node 500 may include a transceiver 520, a processor 528, a memory 534, one or more presentation components 538, and at least one antenna 536. The node 500 may also include a radio frequency (RF) spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable and flexibly usable subframes and slot formats. The transceiver 520 may be configured to receive data and control channels.

The node 500 may include a variety of computer-readable media. Computer-readable media may be any available media that may be accessed by the node 500 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory may include solid-state memory, hard drives, optical-disc drives, etc. As illustrated in FIG. 5, the memory 534 may store a computer-readable and/or computer-executable program 532 (e.g., software codes) that are configured to, when executed, cause the processor 528 to perform various functions disclosed herein, for example, with reference to FIGS. 1 through 4. Alternatively, the program 532 may not be directly executable by the processor 528 but may be configured to cause the node 500 (e.g., when compiled and executed) to perform various functions disclosed herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the program 532 received from the memory 534, and information transmitted and received via the transceiver 520, the base band communications module, and/or the network communications module. The processor 528 may also process information to send to the transceiver 520 for transmission via the antenna 536 to the network communications module for transmission to a CN.

One or more presentation components 538 may present data indications to a person or another device. Examples of presentation components 538 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for transmitting a power headroom report (PHR), the method comprising:
   receiving, from a base station (BS), a Radio Resource Control (RRC) configuration comprising a first RRC parameter and a second RRC parameter; and
   transmitting, to the BS, a PHR medium access control (MAC) control element (CE) comprising a first power headroom (PH) associated with a first transmission reception point (TRP) and a second PH associated with a second TRP,
   wherein:
      the first RRC parameter indicates a first operation mode for a first plurality of PHRs associated with one serving cell of the BS,
      the second RRC parameter indicates a second operation mode for a second plurality of PHRs associated with a plurality of serving cells, including the one serving cell of the BS,
      the first TRP and the second TRP are associated with the one serving cell of the BS,
      the first PH comprises a first Type-1 PH associated with a first physical uplink shared channel (PUSCH) transmission toward the first TRP, and
      the second PH comprises a second Type-1 PH associated with a second PUSCH transmission toward the second TRP.

2. The method of claim 1, further comprising:
   transmitting a first plurality of PUSCH repetitions to the first TRP; and
   transmitting a second plurality of PUSCH repetitions to the second TRP,
   wherein each of the first plurality of PUSCH repetitions and each of the second plurality of PUSCH repetitions are in different slots.

3. The method of claim 2, wherein:
   the PHR MAC CE is transmitted in a first slot for the first plurality of PUSCH repetitions,
   the first PH is for an actual PUSCH transmission associated with the first TRP, and
   the second PH is for a reference PUSCH transmission associated with the second TRP.

4. The method of claim 1, wherein:
   the RRC configuration further comprises a third RRC parameter related to a triggering condition for the transmission of the PHR MAC CE, and
   the third RRC parameter applies to the first TRP and the second TRP.

5. The method of claim 4, wherein the third RRC parameter comprises a threshold of channel variation for the first TRP and the second TRP.

6. The method of claim 4, wherein the third RRC parameter comprises a prohibit timer for the transmission of the PHR MAC CE.

7. The method of claim 1, wherein:
the first TRP is associated with first spatial relation information, and
the second TRP is associated with second spatial relation information.

8. A user equipment (UE) for transmitting a power headroom report (PHR), the UE comprising:
at least one processor; and
at least one non-transitory machine-readable medium coupled to the at least one processor and storing one or more computer-executable instructions that, when executed by the at least one processor, cause the UE to:
receive, from a base station (BS), a Radio Resource Control (RRC) configuration comprising a first RRC parameter and a second RRC parameter; and
transmit, to the BS, a PHR medium access control (MAC) control element (CE) comprising a first power headroom (PH) associated with a first transmission reception point (TRP) and a second PH associated with a second TRP,
wherein:
the first RRC parameter indicates a first operation mode for a first plurality of PHRs associated with one serving cell of the BS,
the second RRC parameter indicates a second operation mode for a second plurality of PHRs associated with a plurality of serving cells, including the one serving cell of the BS,
the first TRP and the second TRP are associated with the one serving cell of the BS,
the first PH comprises a first Type-1 PH associated with a first physical uplink shared channel (PUSCH) transmission toward the first TRP, and
the second PH comprises a second Type-1 PH associated with a second PUSCH transmission toward the second TRP.

9. The UE of claim 8, wherein the one or more computer-executable instructions, when executed by the at least one processor, further cause the UE to:
transmit a first plurality of PUSCH repetitions to the first TRP; and
transmit a second plurality of PUSCH repetitions to the second TRP,
wherein each of the first plurality of PUSCH repetitions and each of the second plurality of PUSCH repetitions are in different slots.

10. The UE of claim 9, wherein:
the PHR MAC CE is transmitted in a first slot for the first plurality of PUSCH repetitions,
the first PH is for an actual PUSCH transmission associated with the first TRP, and
the second PH is for a reference PUSCH transmission associated with the second TRP.

11. The UE of claim 8, wherein:
the RRC configuration further comprises a third RRC parameter related to a triggering condition for the transmission of the PHR MAC CE, and
the third RRC parameter applies to the first TRP and the second TRP.

12. The UE of claim 11, wherein the third RRC parameter comprises a threshold of channel variation for the first TRP and the second TRP.

13. The UE of claim 11, wherein the third RRC parameter comprises a prohibit timer for the transmission of the PHR MAC CE.

14. The UE of claim 8, wherein:
the first TRP is associated with first spatial relation information, and
the second TRP is associated with second spatial relation information.

* * * * *